United States Patent
Oukid et al.

(10) Patent No.: US 10,795,877 B2
(45) Date of Patent: Oct. 6, 2020

(54) MULTI-VERSION CONCURRENCY CONTROL (MVCC) IN NON-VOLATILE MEMORY

(71) Applicant: SAP SE, Walldorf (DE)

(72) Inventors: Ismail Oukid, Leimen (DE); Wolfgang Lehner, Dresden (DE); Daniel dos Santos Bossle, Sao Paolo (BR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/900,150

(22) Filed: Feb. 20, 2018

(65) Prior Publication Data

US 2019/0171721 A1 Jun. 6, 2019

Related U.S. Application Data

(60) Provisional application No. 62/594,270, filed on Dec. 4, 2017.

(51) Int. Cl.
*G06F 12/02* (2006.01)
*G06F 16/23* (2019.01)
(Continued)

(52) U.S. Cl.
CPC ...... *G06F 16/2308* (2019.01); *G06F 11/1474* (2013.01); *G06F 12/0253* (2013.01);
(Continued)

(58) Field of Classification Search
CPC ............. G07F 11/1474; G06F 16/2365; G06F 2201/805
See application file for complete search history.

(56) References Cited

U.S. PATENT DOCUMENTS

2010/0106753 A1* 4/2010 Prabhakaran ......... G06F 3/0619
707/818
2014/0297595 A1 10/2014 Larson et al.
(Continued)

FOREIGN PATENT DOCUMENTS

EP 3 026 583 A1 6/2016

OTHER PUBLICATIONS

Extended European Search Report, dated Jan. 4, 2019, for European Patent Application No. 18191143.9, 8 pages.
(Continued)

*Primary Examiner* — Ryan Bertram
*Assistant Examiner* — Trang K Ta
(74) *Attorney, Agent, or Firm* — Sterne, Kessler, Goldstein & Fox P.L.L.C.

(57) ABSTRACT

Disclosed herein are embodiments for performing multi-version concurrency control (MVCC) in non-volatile memory. An embodiment operates by determining that an event occurred, wherein one or more write transactions to one or more records of a multi-version database that were pending prior to the event did not commit. The one or more write transactions are identified based on a commit value that was stored in the non-volatile memory prior to the event. A particular one of the identified uncommitted write transactions is selected. From the multi-version database, a first version of a record corresponding to the selected uncommitted write transaction that was not committed, and an earlier version of the record that was committed prior to the event are identified. A visibility of the record is set to indicate that the earlier version of the record is visible and the first version of the record is not visible.

17 Claims, 4 Drawing Sheets

(51) Int. Cl.
   G06F 11/14    (2006.01)
   G06F 12/0808  (2016.01)
   G06F 12/0815  (2016.01)
(52) U.S. Cl.
   CPC ...... *G06F 12/0808* (2013.01); *G06F 12/0815* (2013.01); *G06F 16/2329* (2019.01); *G06F 2212/60* (2013.01)

(56) References Cited

U.S. PATENT DOCUMENTS

| | | | | |
|---|---|---|---|---|
| 2015/0242439 | A1* | 8/2015 | Freedman | G06F 9/466 707/703 |
| 2015/0355981 | A1* | 12/2015 | Booss | G06F 16/24561 707/674 |
| 2016/0125022 | A1 | 5/2016 | Rider et al. | |
| 2017/0206137 | A1 | 7/2017 | Larson et al. | |

OTHER PUBLICATIONS

Andrei, M. et al., "SAP HANA Adoption of Non-Volatile Memory," *Proceedings of the VLDB Endowment*, vol. 10, No. 12, 2017, pp. 1754-1765.
Berger, E.D. et al., "Hoard: A Scalable Memory Allocator for Multithreaded Applications," *ASPLOS* 2000, pp. 117-128.
Bryson, M. et al., "Twizzer: The Design and Implementation of a NVM Aware OS," *8th Annual Non-Volatile Memories Workshop (NVMW'17)*, 2017, 2 pages.
Chen, S. et al., "Rethinking Database Algorithms for Phase Change Memory." *CIDR '11*, Jan. 9-12, 2011, pp. 21-31.
Färber, F. et al., "SAP HANA Database: Data Management for Modern Business Applications," *ACM SIGMOD Record*, vol. 40, No. 4, Dec. 2011, pp. 45-51.
Graefe, G. et al., "Orthogonal key-value locking," in Seidl, T. et al. (eds.), *Datenbanksysteme für Business, Technologie and Web (BTW 2015)*, 20156., pp. 237-256.
*jemalloc memory allocator*, as archived on The Wayback Machine at http://web.archive.org/web/20170920140240/http://jemalloc.net/, Sep. 20, 2017, 2 pages.
Johnson, R. et al., "Aether: A Scalable Approach to Logging," *Proceedings of the VLDB Endowment*, vol. 3, No. 1, 2010, pp. 681-692.
Karnagel, T. et al., "Improving In-Memory Database Index Performance with Intel® Transactional Synchronization Extensions," *IEEE 20th International Symposium on High Performance Computer Architecture (HPCA)*, 2014, pp. 476-487.
Kitsuregawa, M. et al., "Application of Hash to Data Base Machine and Its Architecture," *New Generation Computing*, vol. 1, 1983, 63-74.
Lantz, P. et al., "Yat: A Validation Framework for Persistent Memory Software." *USENIX Annual Technical Conference*, Jun. 19-20, 2014, pp. 433-438.
Lee, B.C. et al., "Phase-Change Technology and the Future of Main Memory," *IEEE Micro vol. 30, No. 1,* Jan./Feb. 2010, pp. 131-141.
Lee, E. et al., "On-Demand Snapshot: an Efficient Versioning File System for Phase-Change Memory," *IEEE Transactions on Knowledge and Data Engineering*, vol. 25, No. 12, Dec. 2013, pp. 2841-2853.

Malviya, N. et al., "Rethinking Main Memory OLTP Recovery" *IEEE 30th International Conference on Data Engineering (ICDE)*, 2014, pp. 604-615.
*Memcached—a distributed memory object caching system*, as archived on The Wayback Machine at https://web.archive.org/web/20170926225418/https://memcached.org/, Sep. 26, 2017, 3 pages.
Mittal, S. et al., "A Survey of Software Techniques for Using Non-Volatile Memories for Storage and Main Memory Systems," *IEEE Transactions on Parallel and Distributed Systems*, vol. 27, No. 5, May 2016, pp. 1537-1550.
Mohan, C., "ARIES/KVL: A Key-Value Locking Method for Concurrency Control of Multiaction Transactions Operating on B-Tree Indexes," *Proceedings of the 16$^{th}$ VLDB Conference*, Aug. 1990, pp. 392-405.
Mutlu, O., "Memory Scaling: a Systems Architecture Perspective," *5$^{th}$ IEEE International Memory Workshop (IMW)*, 2013, pp. 21-25.
Neumann, T. et al., "Fast Serializable Multi-Version Concurrency Control for Main-Memory Database Systems," *Proceedings of the 2015 ACM SIGMOD International Conference on Management of Data*, 2015, pp. 677-689.
*Oracle Database Administrator's Guide: Managing Memory*, as archived on The Wayback Machine at http://web.archive.org.web/20170926192440/https://docs.oracle.com/database/121/ADMIN/memory.htm, Sep. 26, 2017, 41 pages.
Oukid, I. et al., "Memory Management Techniques for Large-Scale Persistent-Main-Memory Systems," *Proceedings of the VLDB Endowment*, vol. 10, No. 11, 2017, pp. 1166-1177.
Oukid, I. et al., "FPTree: A Hybrid SCM-DRAM Persistent and Concurrent B-Tree for Storage Class Memory," *SIGMOD '16*, 2016, pp. 371-386.
Qureshi, M.K. et al., "Scalable High Performance Main Memory System Using Phase-Change Memory Technology," *ISCA '09*, 2009, pp. 24-33.
Raman, V. et al., "DB2 with BLU Acceleration: So Much More than Just a Column Store," *Proceedings of the VLDB Endowment*, vol. 6, No. 11, Aug. 26-30, 2013, pp. 1080-1091.
Reed, D.P., "Naming and Synchronization in a Decentralized Computer System," PhD Thesis, Massachusetts Institute of Technology, 1978, 181 pages.
Schwalb, D. et al., "Hyrise-NV: Instant Recovery for In-Memory Databases Using Non-Volatile Memory," Navathe, S.B. et al. (eds.), *International Conference on Database Systems for Advanced Applications*. Springer, 2016, pp. 267-282.
Stonebraker, M. et al., "The End of an Architectural Era (It's Time for a Complete Rewrite)," *VLDB Endowment*, Sep. 23-28, 2007, pp. 1150-1160.
*Telecom Application Transaction Processing Benchmark*, from http://tatpbenchmark.sourceforge.net/, Jul. 2011, 1 page.
*Tile Based Architecture*, from https://github.com/cmu-db/peloton/Tile-Based-Architecture, Feb. 23, 2017, 7 pages.
Volos, H. et al., "Quartz: A Lightweight Performance Emulator for Persistent Memory Software," *Middleware '15*, Dec. 7-11, 2015, pp. 37-49.
Volos, H. et al., "Mnemosyne: Lightweight Persistent Memory," *ASPLOS '11*, Mar. 5-11, 2011, 13 pages.
Wang, T. And Kimura, H., "Mostly-Optimistic Concurrency Control for Highly Contended Dynamic Workloads on a Thousand Cores," *Proceedings of the VLDB Endowment*, vol. 10, No. 2, 2016, pp. 49-60.
Willhalm, T. et al., "SIMD-Scan: Ultra Fast in-Memory Table Scan using on-Chip Vector Processing Units," *Proceedings of the VLDB Endowment*, 2009, pp. 385-394.

* cited by examiner

MULTI-VERSION CONCURRENCY CONTROL (MVCC) IN NON-VOLATILE MEMORY

CROSS REFERENCE TO RELATED APPLICATIONS

This application claims the benefit of U.S. Provisional Patent Application 62/594,270, by Oukid, et al., "Multi-Versioning Concurrency Control (MVCC) In Non-Volatile Memory," filed Dec. 14, 2017; and is related to co-pending U.S. patent application Ser. No. 15/621,640, by Oukid, et al., "Big Block Allocation of Persistent Main Memory," filed Jun. 13, 2017, U.S. patent application Ser. No. 15/621,736, by Oukid, et al., "Defragmentation of Persistent Main Memory," filed Jun. 13, 2017, and U.S. Patent Application No. 2015/0355981, by Booss, et al., "Hybrid SCM_DRAM Transactional Storage Engine for Fast Recovery"; all of which are hereby incorporated by reference in their entireties.

BACKGROUND

Generally, storage class memory (SCM) combines the low latency and byte-addressability of dynamic read access memory (DRAM) with the non-volatility, area density, and economical characteristics of traditional storage media. Furthermore, given the byte-addressability and low latency of SCM technologies, central processing units (CPU) can access data stored in SCM without buffering the data in DRAM. Consequently, SCM technologies blur the distinction between computer memory and traditional storage media. However, SCM may be used in conjunction with DRAM.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for multi-version concurrency control (MVCC) in non-volatile memory.

Figure 1:
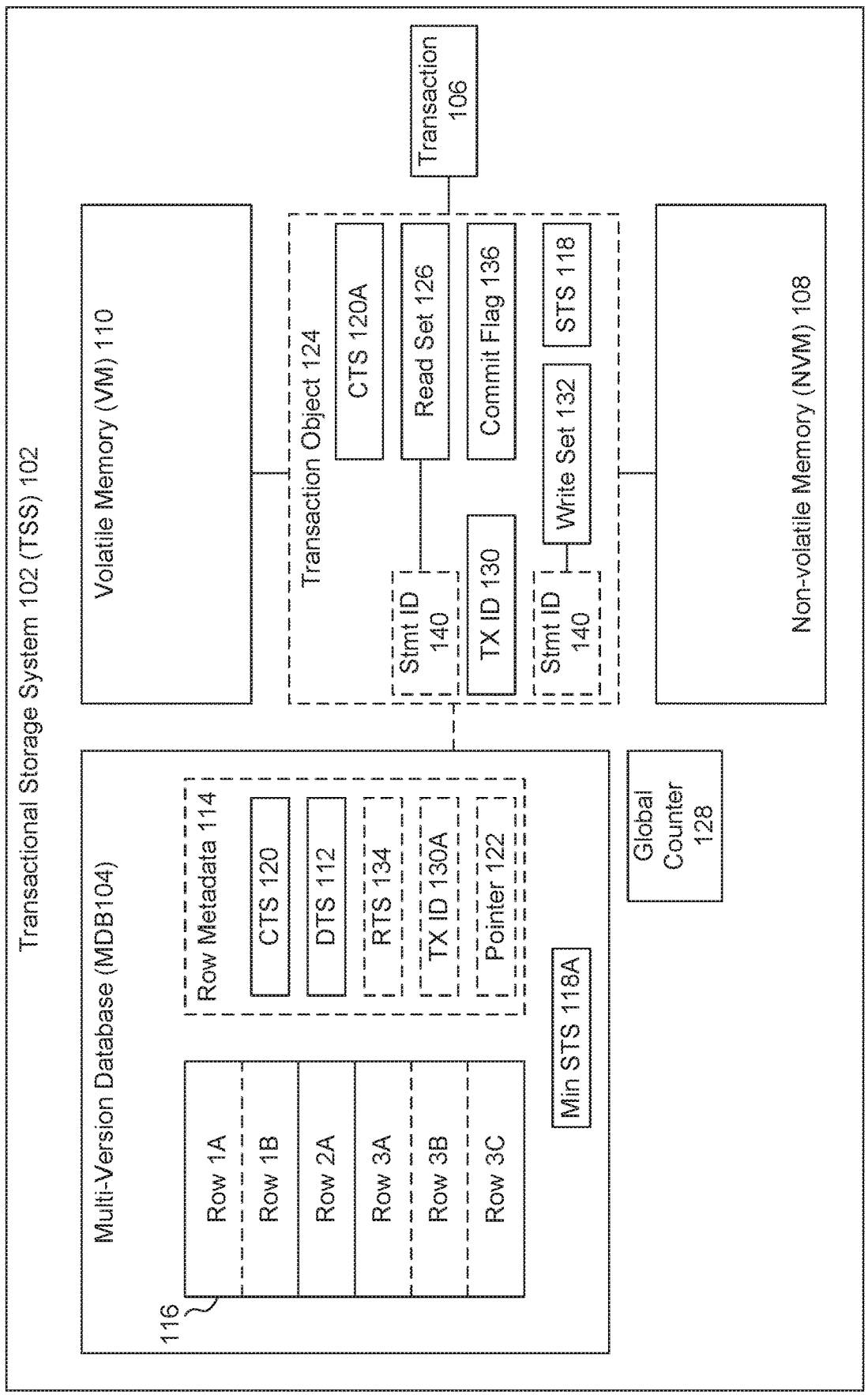
FIG. 1 is a block diagram illustrating examples of multi-version concurrency control (MVCC) in non-volatile memory, according to some embodiments.

FIG. 1 is a block diagram 100 illustrating examples of multi-version concurrency control (MVCC) in non-volatile memory, according to some embodiments. A transactional storage system (TSS) 102 may manage transactions 106 that are being executed against a multi-version database (MDB) 104.

When a transaction makes changes to a database, the changes may be first written to a write-ahead log (hereinafter, "log") before they are written to a disk where the data may be stored or persisted. The log will generally include sufficient information to undo a transaction in case of a transaction failure. The log may also include redo or replay information that enables a replay of the transaction in case of a crash before the data is persisted to the disk. The log itself may be stored on a disk storage.

The log will often contain multiple copies of the data of a database. For example, if a row is updated by a transaction, the log may include both a copy of all of the row data before the update, and a copy of all of the row data after the update, even if the update only changed a single attribute. As such, the log may include redundant information which consumes extra memory to store, and extra computing cycles to write to the disk storage.

In some embodiments, rather than writing certain data (date or log information, for example) to a disk storage, TSS 102 accesses non-volatile memory (NVM) 108. NVM 108 may include byte-addressable memory that can be directly accessed by a processor or other computing device. In an embodiment, NVM 108 may include storage class memory (SCM) that combines the low latency and byte-addressability of dynamic read access memory (DRAM) with the non-volatility, area density, and economical characteristics of traditional storage media. As used herein with respect to some embodiments, storage Class Memory (SCM), byte-addressable, non-volatile memory (NVM), and NVRAM (random access memory), are used interchangeably.

In a general disk-storage system, data may only be accessible to a processor from DRAM. For example, data that is to be written to the disk is first written to DRAM. The data from the DRAM may then be written to or otherwise persisted onto the disk. Similarly, data that is being read from the disk storage is first transferred to DRAM, and then may be accessed by a processor.

NVM 108, by contrast, does not use DRAM as an intermediary. Both volatile memory (VM) 110 and NVM 108 may be byte addressable (at a byte granularity), rather than page (block) addressable (at a page granularity) (as with general disk storage), and thus may be directly accessible without first moving data to/from DRAM. However, unlike VM 110 which may lose data after the power is lost, NVM 108 may maintain its state across power cycles, crashes, or system reboots.

In an embodiment, NVM 108 may be faster or require fewer computing cycles, time, or other resources for read/write access than disk storage, but may be slower than DRAM or other VM 110 accesses. For example, while DRAM accesses may be up to one million times faster or cheaper than disk accesses, accessing VM 110 may be five times faster (or consume 5 times fewer computing cycles or processing recourses) than accessing NVM 110.

Instead of writing duplicative transaction information to a log which may waste both memory and computing cycles, TSS 102 may utilize having direct access to both NVM 108 and VM 110, and use them in conjunction with one another to store information without wasting the resources necessary to maintain a log. TSS 102 may take advantage of the efficiencies of NVM 110 storage over general disk storage to manage transactions 106 operating on or against data of MDB 104.

MDB 104 may be a multi-versioning database that stores or maintains multiple versions of data. MDB 104 may enable different versions of data to be accessed and/or modified by different transactions 106 based on timestamps of the data and the transactions.

In an embodiment, data of MDB 104 may not be overwritten or deleted. For example, when new data is added to MDB 104 (e.g., by a transaction 106), a new row 116 may be inserted. When data is deleted from MDB 104, a deletion timestamp (DTS 112) may be updated to indicate that the row is no longer visible (MDB 104 may persist the original "deleted" data until a garbage collection time). When data is to be updated in MDB 104, the DTS 112 of the original version of the row may be updated to indicate the original row data is no longer visible, a new row with the updated data may be inserted, and an indication (such as a pointer 122) may be provided to indicate that the deleted row and newly added row are different versions of the same record or data.

MDB 104 may maintain information about the records or rows 116 as row metadata 114. In an embodiment, row metadata 114 may include timestamp information such as a create or commit timestamp (CTS 120), a delete timestamp (DTS 112), and a read timestamp (RTS) 134.

Due to the multi-versioning operation of MDB 104, delete operations performed by transactions 106 may be logical in nature, such that the deleted version of the row may remain in memory or as part of MDB 104 until the deleted row is garbage collected. Maintaining the original (deleted) row data may enable access to information necessary if a transaction 106 needs to be undone or rolled back in case of a crash or other failure. As indicated above, a deletion operation may be performed by updating the DTS 112 to indicate at what time the row is no longer visible to transactions 106. Then, for example, any transactions 106 that begin (e.g., have a starting timestamp (STS) 118) after the DTS 112 may not be able to see or access the deleted data.

CTS 120 may indicate when the row (or version of the row) was created, committed, or otherwise became visible to transactions 106. For example, a transaction 106 with a STS 118 prior to CTS 120 of a row 116 would not be able to see or access the row data (because the row 116 was not created when the transaction started). In an embodiment, a record or row 116 may include both a CTS 120 and a DTS 112 that indicates when the row was visible. TSS 102 may use CTS 120, DTS 112, and STS 118 to determine which data or records 116 were visible to which transactions 106 during their execution or operation.

In an embodiment, DTS 112 may be used to indicate whether the current version of the row is the most up-to-date version of the record or row. For example, DTS 112 may be set to a value of infinity, a negative number, or some other specified value that may indicate that it is the most up to date version of the row, column, or record (if multiple versions of the row exist). If the row is deleted by a transaction 106, then DTS 112 may indicate a timestamp as to when the deletion occurred or was committed. As used herein, record, row, tuple, and column may all be used interchangeably.

In an embodiment, MDB 104 operate as append only storage in which row updates may be generated by appending or adding a full row tuple or row values, even if only one attribute of the row is updated. For example, a transaction 106 may create or append a new copy of the row (a new version of the row) to a table of MDB 104, update the attributes of the new version of the row, and link or point the new version to the previous version of the record or tuple. The new or newest version of a row may either be the head or the tail of a version chain of the row. In an embodiment, using append only, TSS or MDB 104 may store attributes contiguously in memory (e.g., NVM 108), which may minimize CPU cache misses and improve performance.

A delete operation may either be a full stop deletion or may be part of an update operation. In the case of a full stop deletion of a row, DTS 112 may be updated to STS 118 or CTS 120A of the transaction 106 deleting the row, and the deletion may be complete. In an embodiment, STS 118 may indicate when the transaction 106 begins, and CTS 120A may indicate a time when the transaction is committed or persisted.

In the case of an update operation, the new version of the data may include a CTS 120 that is the same as the DTS 112 of the previous version of the record (that is deleted). In an embodiment, the old and/or new versions of the data may include pointers 122 that indicate they are related.

In an embodiment, TSS 102 may use CTS 120 and DTS 112 and/or inverted indexes to track different versions of a row. In an embodiment, an inverted index may use a row identifier as a reference to the tuple. From the inverted index, it may then be determined which rows are different versions of each other.

MDB 104 may maintain multiple versions of a single tuple or database record, and each version may represent the state of the tuple in a particular time interval. In the example shown in FIG. 1, MDB 104 includes 2 versions of Row 1, a single version of row 2, and three versions of row 3. Though rows of data are indicated in the example shown, in other embodiments, columns or other records may be used to store or represent data in addition to or in lieu of rows. In an embodiment, the term "row" as used herein may refer to a logical row or tuple.

As long as an MDB 104 maintains an old version of a tuple or record, the state of the data or database can be determined during previous time periods (and rolled back if necessary). As noted above, MDB 104 may maintain metadata that indicates a state of the data at various time periods (as indicated by CTS 120 and DTS 112). Thus, at any point in time, TSS 102 may determine which data (versions) were visible to a particular transaction 106 based on the STS 118.

As such, MDB 104 may enable read queries to read a consistent version of the data regardless of whether the data has been updated. For example, when a transaction 106 is received or begins, TSS 102 may create (or reuse a previously created) transaction object 124 that includes information or metadata about the transaction 106. The transaction object 124 information may be used to determine a state of the transactions 106 at different points in time, and particularly in case of a crash or failure in which one or more ongoing or inflight transactions did not complete.

Transaction object 124 may include a read set 126. Read set 126 may indicate which rows (versions) of the data were accessed or read by the transaction 106. Each row or record of read set 126 may include a CTS 120 that is less than or equal to STS 118 of the transaction 106. Then, for example, for the life of the transaction 106, the transaction may have access to the same data (even if it was subsequently deleted by a later transaction 106) while the transaction is still ongoing.

In an embodiment, TSS 102 may include a global counter 128. Global counter 128 may track or indicate what values are to be used for the various timestamps of the rows/records and transactions described herein. In an embodiment, when a transaction 106 is received or begins, its STS 118 may be set equal to the current value of the global counter 128 (or the time of global counter 128 may be incremented and set as STS 118).

In an embodiment, global counter 128 may be a logical time that is incremented for each write transaction that is begun and/or committed. For example, a first write transaction may occur at timestamp 1, while a second subsequent write transaction may be assigned timestamp 2. In another embodiment, timestamps may relate to clock time rather than integer or numeric counts. In an embodiment, a timestamp may be 8 bytes long and include unsigned integers generated by a global timestamp counter 128 (current time) which is automatically incremented for every commit or new write transaction.

When a transaction 106 begins, it may be assigned a unique TXID 130, and an STS 118 equal to the current logical time from global counter 128. In an embodiment, the timestamp assigned to a particular transaction may be used as the transaction identifier (TXID) 130 for that transaction 106. In another embodiment, different values may be used for TXID 130 and STS 118. For example, TXIDs 130 may include values that are in the range of 1 to $2^{63}$, while timestamps may be in the range of $2^{63}$-$2^{64}$. In other embodiments, different values may be used.

As discussed in greater detail below, if CTS 120 or DTS 112 is set to TXID 130 of a particular transaction 106, the TXID 103A value may indicate to other transactions 106 trying to access the data that the data is locked (and potentially being modified by the indicated transaction). Then, for example, the requesting transaction may request a visibility status of the data from the locking transaction.

When reading a row, a transaction 106 may be able to read a row's latest version if the row is not locked by another transaction, and the STS 118 of the transaction falls between the CTS 120 and DTS 112 of the row. In an embodiment, TSS 102 may abort transactions whenever it encounters a locked tuple. If these conditions are satisfied, then the transaction may set the read timestamp (RTS) 134 of the row to its TXID 130 if the existing RTS 134 is lower than the new transaction's TXID 130. RTS 134 may indicate the oldest transaction 106 accessing a particular row 116. If these conditions are not satisfied, the transaction reads an older version of the row and the RTS 134 of the row is not updated. In another embodiment, TSS 102 may not use or maintain a RTS 134.

TSS 102 enables transactions 106 to read rows 116 without acquiring a lock. TSS 102 maintains a read set 126 indicating which versions of which rows were read by the query or transaction 106 at a read or start time 118. In an embodiment, at a commit time (when data of a write set 132 is about to be written or persisted to NVM 108), the read set 126 may be re-read and intersected with the original read set. If none of the data has changed, then the transaction enters the write phase which begins by acquiring a commit timestamp (CTS 120A), then updating the metadata of the modified rows or tuples (setting the CTS 120 of created tuples and the DTS 112 of deleted tuples to the CTS 120A). This process is described in greater detail below. Otherwise, if the data was changed between the STS 118 and CTS 120A, the transaction may be aborted.

An inflight transaction 106 may be a transaction that is in progress, that may have accessed and modified some data, but that has not yet completed. As referenced above, a disk system may use a write-ahead log to undo inflight transactions that may have not completed if a system crashes or there is some other failure. Rather than maintaining a write-ahead log, TSS 102, may use the previous versions of the data as stored or maintained by MDB 104 to determine the undo information that would otherwise be written to the log (thus obviating the need to use computing resources to write to and maintain a log).

In an embodiment, by avoiding writing duplicative information to the log, TSS 102 uses fewer memory resources (that would otherwise be consumed by the redundant log information) and improves throughput by avoiding performing the log-write transactions. The result may be a faster system, consuming fewer computer resources than a log-write system. In an embodiment, TSS 102 may create or use a log to ship or provide transactional data to another system which may be used for replication or other purposes. For example, replication may require shipping a log from a first system to a second system.

TSS 102 may obtain the 'log information' from both the previous versions of the rows stored by the MDB 104 and from the information of transaction object 124 (which may be stored in NVM 108). As noted above, transaction object 124 may include a read set 126 that includes identifiers or the rows that were read by the transaction 106. Transaction object 124 may also include a write set 132 that identifies rows that were inserted, updated (deleted and inserted), or deleted by the transaction 106. In an embodiment, read set 126 and write set 132 may include arrays of row identifiers or references indicating which rows were accessed or modified (without including all of the original information of the rows that would generally be written to a log).

Rather than storing transaction object 124 in DRAM or other volatile memory, which may be lost on a power cycle, and maintain a separate log on the disk as may be done in general disk-based storage systems, TSS 102 may store a portion of transaction object 124 in VM 110, and another portion of transaction object 124 in NVM 108 which may be persistent. In an embodiment, read set 126 may be stored in VM 110, and the write set 132 may be stored in NVM 108. In some embodiments, a portion (such as read set 126) may be stored in both NVM 108 and VM 110.

Write set 132 may include which rows 116 were added, updated, or deleted by a transaction 106. In an embodiment, each time there is a new entry in write set 132 (e.g., data is inserted or deleted in MDB 104), the entry or write set 132 may be persisted in NVM 108. Then, for example, TSS 102 may use the combination of the persisted write set 132 from NVM 108 with the versioning information stored by MDB 104 to account for the information stored in a log of a general disk-based storage system. Using the persisted information of transaction object 124 (in NVM 108), in the event of a crash, power loss, or other system failure, TSS 102 may identify and roll back inflight transactions 106 that did not complete. For example, the write set 132 and other persisted transaction object 124 information may be used to identify the rows of the inflight transaction 106 that were changed, and the previous versions of those rows may be determined from the stored information of MDB 104.

In an embodiment, transaction object 124 may include a commit flag 136 that indicates whether or not the transaction has been committed. Commit flag 136 may be stored in NVM 108. Then, for example, upon system crash and reboot or restart, TSS 102 may identify any transactions 106 for which the commit flag 136 is not set to identify the in-flight transactions that are to be rolled back. In an embodiment, write set 132 may include two subsets, such as a create subset that references the rows created by the transaction, and a delete subset that references the rows deleted by the transaction.

In an embodiment, the transient part of the transaction object 124 stored in VM 110 may include information that would not be necessary to rollback uncompleted transactions 106. Example transaction object 124 information that may be stored in VM 110 may include a status variable that may indicate whether a transaction is invalid, active, committed, or aborted, TXID 130, STS 118, a scan set, a read set 126 that references visible rows read by the transaction during its lifetime, excluding the rows referenced in the create and delete sets, list of garbage entries registered by a previous transaction that used the same transaction object (in the case of transaction object 124 reuse), and an abort flag that indicates that the transaction has to be aborted because a conflict with another transaction is detected. In an embodiment, the scan set may contain the predicates that were used to search data, For example, the scan set may be used at commit time to redo all the searches and construct a new read set which is intersected with the old one.

In other embodiments, some or all of this information may be persisted to NVM 108, or may be stored in both VM 110 and NVM 108. For example, CTS 120A may be maintained in both the persistent portion of the transaction object 124 in NVM 108 and the transient portion of the transaction object 124 in VM 110.

In an embodiment, whatever information of transaction object 124 may be required or otherwise used to provide durability and/or atomicity (operation or transaction operates completely or not at all) may be stored in NVM 108. For example, if a transaction 106 partially executes and MDB 104 or another related system or computing device crashes then is rolled back or changes or undone, the information from NVM 108 may be used. If information is needed or useful to provide either such durability or atomicity it is stored in NVM 108, and other information may be stored in VM 110.

Algorithm 1 provides example operations of how TSS 102 may determine whether or not a particular row 116 is visible to a particular transaction 106, according to an embodiment. TSS 102 may read the current time from global counter 128 which may be set as the STS 118 of the transaction 118. Based on STS 118, TSS 102 may determine which rows are visible to the transaction 106. If a row CTS 120 is greater than or after STS 118, or if a row DTS 112 is prior to STS 118, then the row would not be visible to the transaction 106. If, however, STS 118 falls within CTS 120 and DTS 112, then the row may be visible to the transaction 106.

In an embodiment, the values of CTS 120 and DTS 112 may either be a timestamp value or a transaction identifier (TXID) 130A corresponding to a TXID 130 of a particular transaction 106 which may be accessing the row or data. If CTS 120 or DTS 112 is a TXID 130A value, this may indicate that the row is locked by the identified transaction.

In an embodiment, when a row is locked by another transaction, TSS 102 may query the transaction to determine the state of the data and determine whether or not the row is visible. For example, if the transaction has not yet committed, and this is a newly inserted row, then the row may not be read or accessed. Or, for example, if the transaction has committed, then the row may be read.

---

Algorithm 1

```
1:  function ISVISIBLE(mvcc&, atTime, txid)
2:      if mvcc.CTS = = 0 or mvcc.DTS = = 0 then        ▷ CTS and/or DTS not initialized
3:          return false;
4:      do
5:          cts = mvcc.CTS; dts = mvcc.DTS;              ▷ Read current state of CTS and DTS
6:          if dts > = kMinTS then                        ▷ DTS is a timestamp
7:              dtsVisible = atTime < dts;
8:          else                                         ▷ DTS is a transaction ID
9:              rslt = GetTxInfo(dts).IsTsVisible(mvcc.DTS, atTime, txid);
10:             if rslt = = −2 then
11:                 continue;                             ▷ New transaction, redo check
12:             if rslt = = −1 then
13:                 GetTxInfo(txid).willAbort = true;
14:                 return false
15:             dtsVisible = ! rslt;                      ▷ txInfo.IsTsVisible returns 0 when DTS is visible
16:         if cts > = kMinTS then                        ▷ CTS is a timestamp
17:             ctsVisible = atTime >= cts;
18:         else                                         ▷ CTS is a transaction ID
19:             rslt = GetTxInfo(cts).IsTsVisible(mvcc.CTS, atTime, txid);
20:             if rslt = = −2 then
21:                 continue;                             ▷ New transaction, redo check
22:             if rslt = = −1 then
23:                 GetTxInfo(txid).willAbort = true;
24:                 return false;
25:             ctsVisible = rslt;                        ▷ txInfo.IsTsVisible returns 1 when CTS is visible
26:         return cts Visible and dtsVisible;
27:     while true
```

Algorithm 2

```
1:  function TXINFO::ISTSVISIBLE(ts, atTime, callerTxid)
2:      locked scope (mutex);
3:      if ts != txid or status = = kInvalid then      ▷ If TX with ID 'ts' finished
4:          return −2;                                  ▷ Must redo check from the beginning
5:      if txid = = callerTxid then                     ▷ Row is locked by the caller transaction
6:          return 1;      ▷ Rows created (deleted) by a transaction are visible (invisible) to itself
7:      if status != kCommitted then                    ▷ If TX is Active or Aborted
8:          return −1;                                  ▷ Conflict. The transaction should be aborted
9:      return atTime > = commitTS;                     ▷ Return 1 if expression is true, 0 otherwise
```

Algorithm 2 is an example function that may be used in executing Algorithm 1, illustrating how TSS 102 checks row visibility of a row that is locked by another transaction, according to an embodiment. TSS 102 may query the locking transaction to determine the row status.

In an embodiment, TSS 102 may maintain a minimum STS 118A which may be beneficial for garbage collection purposes. For example, TSS 102 may identify the STS 118 of the oldest running transaction (min STS 118A), and if the STS 118 of this transaction (min STS 118A) is greater than the DTS 112 of a particular or identified row, the row may be garbage collected. For example, if min STS 118A is 5, then any row with DTS 112 of 4 or lower may be garbage collected. The memory of the garbage collected row may then be reused or made available for new data or information.

In an embodiment, TSS 102 may operate regardless of whether MDB 104 is a column store or row store database. The logical representation of the values of a table may be operated on in a similar manner. For example, the values of a particular row or column may be contiguously stored in memory. In an embodiment, when TSS 102 retrieves record IDs for a specific number or instances of predicates, it abstracts away how the data is organized or stored in memory.

visible (the CTS 120 or DTS 112 may still be set to 0). In an embodiment, a new row added to MDB 104 may include CTS 120 and DTS 112 which are both initially set to zero. The changes may not be effective (visible) until the CTS 120 and/or DTS 112 are updated (as shown in lines 6-7). In line 6, the CTS 120 may be set to TXID 130A, so the row is locked. The DTS 112, in line 7, may be set to infinity which means the row is visible.

However, before CTS 120 or DTS 112 are updated, TSS 102 may first update the create set of write set 132 in NVM 108 as shown in line 5. In an embodiment, a table identifier and row identifier, or other value(s), may be added to the create set. Other embodiments may include other references to indicate which row or record is being appended, created, or added. Write set 132 may simply include a reference to, not a copy of, the record being added. Updating the create set of write set 132 is performed before either the CTS 120 or DTS 112 are updated.

Prior to committing a transaction, the newly appended records of the write set 132 may be persisted to NVM 108 (before updating the CTS 120 or DTS 112 of particular rows or records 116). When a transaction 106 is committed, the CTS 120 value may be updated from TXID 130A to a commit timestamp of global counter 128 at commit time,

Algorithm 3

```
1:  function INSERT(tableName, rowValues, txid)
2:      txInfo = GetTxInfo(txid);
3:      (tabID, pTab) = GetTablePointer(tableName);
4:      rowID = pTab→Insert(rowValues);                         ▷ Insert row and update inverted indexes
5:      GetPersTxInfo(txid).createSet.PersistentAppend({tabID, rowID});   ▷ Update create set
6:      pTab→MVCC[rowID].CTS = txid;                            ▷ Lock row by setting its CTS to txid
7:      pTab→MVCC[rowID].DcTS = kInfinityTS;
8:      return true;
```

Algorithm 3 is an example of how TSS 102 may insert or append a new row to MDB 104, according to an embodiment. For example, a new row may be appended with the values we want to insert. Up until line 4, TSS 102 may not persist data because if a crash occurred, the row is not yet and the commit flag 136 is set. In an embodiment, when the commit flag 136 is set, the global counter 128 may be incremented and used as the commit timestamp 120A of the transaction 106, which may be used as the CTS 120 or DTS 112 of the row(s) updated by the transaction 106.

Algorithm 4

```
1:  function DELETE(tableName, predicates, txid)
2:      txInfo = GetTxInfo(txid);
3:      (tabID, pTab) = GetTablePointer(tableName);
4:      rowIDs = GetVisibleRows(pTab, predicates, txInfo.STS, txid);
5:      if txInfo.willAbort then
6:          abort(txid);
7:          return false;
8:      txInfo.scanSet.Append({tabID, predicates});                     ▷ Update scan set
9:      for each rowID in rowIDs do
10:         GetPersTxInfo(txid).deleteSet.PersistentAppend({tabID, rowID});   ▷ Update delete set
11:         if !TryToDelete(rowID, txid) then       ▷ Try to lock row by atomically setting its DTS to txid
```

Algorithm 4

| | | |
|---|---|---|
| 12: | abort(txid); | ▷ Abort if failed to delete row |
| 13: | return false; | |
| 14: | return true; | |

Algorithm 4 is an example of a delete function which may be performed by TSS 102 when a transaction deletes a row, according to an embodiment. In the algorithm above, TSS may perform a look up to determine which rows are visible and satisfy a predicate up to line 7. In lines 9-13, TSS 102 may first append an entry or reference to the row to the delete set of the write set 132 before making any additional modifications, which is persisted in NVM 108. Then, for example, after write set 132 has been updated and persisted, TSS 102 may write TXID 130A into the DTS 112 which may signal as a lock on the record. Any subsequent transactions would then know that the row is locked because the DTS 112 is a TXID 130A instead of a timestamp.

Algorithm 5 is an example of an update operation that may be performed by TSS 102, according to an embodiment. As noted above, an update operation may involve a delete row operation followed by an insert row operation (in which the DTS 112 of the deleted row and the CTS 120 of the inserted row are the same). Lines 9-13 show an example of performing a delete operation (as described above with respect to Algorithm 4). Once the delete completes, a new version of the row may be created (as shown in lines 16-20, and as described above with respect to Algorithm 3). In Algorithm 5

```
1:  function UPDATE (tableName, predicates, colFilter, newValues, txid)
2:      txInfo = GetTxInfo(txid);
3:      (tabID, pTab) = GetTablePointer(tableName);
4:      rowIDs = GetVisibleRows(pTab, predicates, txInfo.STS, txid);
5:      if txInfo.willAbort then
6:          abort(txid);
7:          return false;
8:      txInfo.scanSet.Append({tabID, predicates});              ▷ Update scan set
9:      for each rowID in rowIDs do
10:         GetPersTxInfo(txid).deleteSet.PersistentAppend({tabID, rowID});   ▷ Update delete set
11:         if !TryToDelete(rowID, txid) then   ▷ Try to lock row by atomically setting its DTS to txid
12:             abort(txid);                                     ▷ Abort if failed to delete row
13:             return false;
14:     rows = pTab→GetValIDs(rowIDs);                           ▷ get ValueIDs of the deleted rows
15:     Update Rows(rows, colFilter, newValues);                 ▷ Apply update to rows
16:     for each row in rows do                                  ▷ Insert back updated rows
17:         rowID = pTab→Insert(row);
18:         GetPersTxInfo(txid).createSet.PersistentAppend({tabID, rowID});
19:         pTab→MVCC[rowID].CTS = txid;                         ▷ Lock row by setting its CTS to txid
20:         pTab→MVCC[rowID].DTS = kInfinityTS;
21:     return true;
``` another embodiment, the insert operation may be performed prior to the delete operation in the update operation.

Algorithm 6

```
1:  function COMMIT(txid)
2:      txInfo = GetTxInfo(txid);
3:      pTxInfo = GetPersTxInfo(txid);
4:      if pTxInfo.createSet.Empty( ) and pTxInfo.deleteSet.Empty( ) then        ▷ Read-only TX
5:          txInfo.SetInvalid( );                                ▷ Terminate TX (starTS is used as commits)
6:          return true;
7:      txInfo.commitTS = AtomicIncrement(m_currentTime);        ▷ Acquire commitTS
8:      for each scan in txInfo.scanSet do                       ▷ Redo all scans at time commitTS
9:          rowIDS = GetVisibleRows(m_tables[scan.tabID], scan.predicates, txInfo.commitTS, txid);
10:         for each rowID in rowIDs do
11:             newReadSet.Append({scan.tabID, rowID});
12:     readSetDiff = Difference(txInfo.readSet, newReadSet);
13:     for each row in readSetDiff do   ▷ Only rows modified by TX are allowed to be in readSetDiff
14:         mvcc = m_table s[row.tabID]→MVCC[row.rowID];
15:         if mvcc.CTS != txid and mvcc.DTS != txid then
16:             abort(txid);
17:             return false;
18:     pTxInfo.commitTS = info.commitTS;                        ▷ Persist commit timestamp in pTxInfo
19:     MemBarrier( );                 ▷ Ensure ordering of write s to commitTS and IsCommitted
20:     pTxInfo.IsCommitted = TRUE;                              ▷ Persist information that this TX committed
```

Algorithm 6

```
21:    Persist(&(pTxInfo.IsCommitted));                    ▷ commitTs and IsCommitted share the same cache line
22:    txInfo.SetCommitted( );                                                    ▷ Set TX status to committed
23:    for each row in pTxInfo.deleteSet do                                       ▷ Update DTS of deleted rows
24:        m_tables[row.tabID]→MVCC[row.rowID].DTS = txInfo.commitTS;
25:    for each row in pTxInfo.createSet do                                       ▷ Update CTS of created rows
26:        m_tables[row.tab ID]→MVCC[row.rowID].CTS = txInfo.commitTS;
27:    MemBarrier( );                              ▷ Ensure that all updates to mvcc entries finish executing
28:    for each row in pTxInfo.createSet ∪ pTxInfo.deleteSet do    ▷ Flush mvcc of created and deleted rows
29:        Flush(&m_tables[row.tabID]→MVCC[row.rowID]);                                ▷ Asynchronous flush
30:    MemBarrier( );                                      ▷ Ensure that all flushes finish executing
31:    txInfo.addGarbage(info.commitTS, pTxInfo.deleteSet);             ▷ Register deleted rows as garbage
32:    pTxInfo.createSet.Clear( );                                                     ▷ Clear create set
33:    pTxInfo.deleteSet.Clear( );                                                     ▷ Clear delete set
34:    txInfo.SetInvalid( );                                                           ▷ Terminate TX
35:    return true;
```

Algorithm 6 is an example of a transaction commit that may be performed by TSS 102, according to an embodiment. During the commit, TSS 102 may check and see if a conflict has occurred between the transaction 106 that is to be committed and another transaction. For example, in lines 8-11, the rows from read set 126 may be re-read and may be intersected with or compared to the previous read values to determine whether the data was updated (by another transaction) in the intermediary. If the data has not been updated (in there is no conflict with another transaction), TSS 102 may acquire a CTS 120A (line 7) from global counter 128 by incrementing a global time which may return a new time value for CTS 120A.

If a conflict is detected, the transaction 106 may be aborted. In an embodiment, an abort flag of transaction object 124 may be set. In determining whether to commit or abort a transaction 106, TSS 102 may confirm that the data read when the transaction started at STS 118 is the same data visible with the newly acquired CTS 120A. TSS 102 ensures that the input data used by the transaction has not been changed by this or another transaction. If any of the read rows of read set 126 are changed, then the transaction is aborted. In an embodiment, the only exception to a differing read set is shown in lines 13-17 in which the transaction itself inserted, deleted or modified the data.

If no conflicts are detected, the transaction object 124 status may be updated to committed. In lines 18-21, the CTS 120 is updated to CTS 120A and a memory barrier is issued to ensure writes are done in this order, commit flag 136 is set, and both commit flag 136 and CTS 120A may be persisted in NVM 108. Commit flag 136 and CTS 120A may enable TSS 102 to undo changes made by an inflight transaction that had not yet completed at a failure time.

Once the data has been persisted to NVM 108, even if there is a crash, instead of rerunning the transaction, TSS may complete or finish the commit protocol. To finish the commit protocol, TSS 102 may read the DTS 112 of the rows in the delete set that has a value of TXID 130A, and set the value of DTS 112 to the CTS 120A. TSS 102 may perform a similar operation with the rows in the create set of write set 132, except CTS 120 for each row is updated from TXID 130A to the CTS 120A. When the timestamp of a row is updated from TXID 130A to CTS 120A, then there is no longer a need to query the transaction about the visibility of the row.

In lines 28-29, data is explicitly flushed from the volatile CPU cache portion of NVM 108 to the non-volatile portion. In an embodiment, the data that is flushed may include the CTS 120 and/or DTS 112 of inserted/deleted rows in write set 132; the appended records may be persisted to NVM 102 prior to acquiring the CTS 120A (and using it to update the CTS 102 or DTS 112). The change is persisted before finishing the transaction. The rows that are deleted are candidates to be garbage collected. In an embodiment, TSS 102 may determine which of these rows can be immediately garbage collected, and may free that space for use by another transaction or data. If the deleted row is not available for garbage collection, then the version of the row remains a part of MDB 104. The transaction may finish by setting the status in transaction object 124 to invalid or completed.

Algorithm 7

```
 1: function ABORT(txid)
 2:     txInfo = GetTxInfo(txid);
 3:     pTxInfo = GetPersTxInfo(txid);
 4:     txInfo.SetAborted( );                                                       ▷ Set status to Aborted
 5:     for each row in pTxInfo.deleteSet do                                        ▷ Reactivate deleted rows
 6:         if m_tables[row.tabID]→MVCC[row.rowID].DTS = = txid then    ▷ If DTS is locked by this TX
 7:             m_tables[row.tabID]→MVCC[row.rowID].DTS = kInfinityTS;
 8:     for each row in pTxInfo.createSet do                                     ▷ Set created rows as invalid
 9:         m_tables[row.tabID]→MVCC[row.rowID].CTS = 0;                         ▷ Mark row as invalid
10:         m_tables[row.tabID]→MVCC[row.rowID].DTS = CurMinSTS;                 ▷ Set DTS to CurMinSTS
11:     MemBarrier( );                          ▷ Ensure that all updates to mvcc entries finish executing
12:     for each row in pTxInfo.createSet ∪ pTxInfo.deleteSet do        ▷ Flush mvcc of changed rows
13:         Flush(&m_tables[row.tabID→MVCC[row.rowID]);                          ▷ Asynchronous flush
14:     MemBarrier( );                                   ▷ Ensure that all flushes finish executing
15:     CollectGarbage( {kMinTS, pTxInfo.createSet});                     ▷ Collect garbage (created rows)
```

Algorithm 7

```
16:    pTxInfo.deleteSet.Clear ( );                    ▷ Clear delete set
17:    pTxInfo.createSet.Clear( );                     ▷ Clear create set
18:    txInfo.SetInvalid ( );                          ▷ Terminate TX
```

Algorithm 7 is an example abort operation that may be performed by TSS 102, according to an embodiment. As noted above, when a conflict occurs (e.g., the read set 126 of data changed while a transaction was executing), a transaction may be aborted. TSS 102 may identify the delete set and unlock the row that was locked for deletion. For example, in lines 5-7, the rows which DTS 112 is set to TXID 130A may be reset to infinity, thus indicating the rows are once again visible.

For an undo of a create set that was added by an aborted transaction that was not committed, the rows were not visible (CTS 120 was set to TXID 130A). As such, TSS 102 may update the value of CTS 120 of those rows to 0, and set the corresponding DTS 112 value to or below min STS 118A, making the rows immediately available for garbage collection thus saving memory and resources, making them available immediately for more data. In lines 12-13, the changes may be flushed.

of 1 to $2^{63}$ may be transaction identifiers, and the values from $2^{63}-2^{64}$ may be timestamp values. The CTS 120 and DTS 112 values may then be determined whether they are less than or greater than a middle value to determine whether the value is a timestamp or TXID 130A. This may be performed for each row of write set 132. In another embodiment, the values of CTS 120 and DTS 112 may be checked if they are equal to TXID 130 which may be persisted in NVM 108.

If DTS 112 is less than a minimum timestamp, then it is not a timestamp value, it is a TXID 130A. This indicates that the row was locked by this transaction during a crash time. If the value is not a timestamp, TSS 102 may determine whether or not the transaction committed by checking the commit flag 136. If the transaction is not committed, then it may be aborted and rolled back.

In an embodiment, if a transaction is committed, then TSS 102 may roll forward/complete the commit, and the trans-

Algorithm 8A

```
1   function RECOVERTRANSACTION(pTxInfo, ts)
2       pTxInfo.createSet.Recover( );                                    ▷ Recover create set
3       pTxInfo.deleteSet.Recover( );                                    ▷ Recover delete set
4       for each row in pTxInfo.deleteSet do
5           if m_tables[row.tabID]→MVCC[row.rowID].DTS < kMinTS then     ▷ If DTS is at txid
6               m_tables [row.tabID]→MVCC[row. rowID].DTS = ts;          ▷ Finish commit or undo row creation
7       for each row in pTxInfo.createSet do
8           m_tables[row.tabID]→MVCC[row.rowID],CTS = ts;                ▷ Finish commit or undo row creation
9           if pTxInfo.IsCommitted = = TRUE then
10              m_tables[row.tabID]→MVCC[row.rowID].DTS = kInfinityTS;   ▷ Set DTS if TX committed
11          else
12              m_tables[row.tabID]→MVCC[row.rowID].DTS = CurMinSTS;     ▷ Set DTS to CurMinSTS
13      MemBarrier( );                              ▷ Ensure that all updates to mvcc entries finish executing
14      for each row in pTxInfo.createSet ∪ pTxInfo.deleteSet do         ▷ Flush mvcc of changed rows
15          Flush(&m_tables[row.tabID]→MVCC[row.rowID]);
16      MemBarrier( );                              ▷ Ensure that all flushes finish executing
17      pTxInfo.createSet.Clear( );
18      pTxInfo.deleteSet.Clear( );
```

Algorithm 8A is an example transaction recovery function that may be performed by TSS 102, according to an embodiment. Algorithm 8A may enable TSS 102 to handle and recover from inflight transactions that are occurring during a system failure, power loss, or reboot.

Upon system reboot or restart, TSS 102 may determine that commit flag 136 is not set for a particular transaction. In lines 2-3, TSS 102 may retrieve the write set 132 (create and delete sets) from NVM 108. For the DTS 112 of deleted rows and CTS 120 of created rows, it is determined whether the values are set to timestamps or transaction IDs 130A.

As noted above, in an embodiment, TSS 102 may distinguish between timestamps and TXID 130A by splitting a domain of integers into two parts. For example, the values action may end or complete there. Or for example, if a transaction is not committed, then TSS 102 may either (1) roll back the transaction in case the write set 132, CTS 120, and the commit flag 136 are persisted; or (2) roll back the statement that was executing at failure time, and allow the user to decide whether he/she wants to continue the transaction or abort it (the statement or transaction).

In an embodiment, rolling back a statement may occur when a statement ID 140 is stored as part of both read set 126 and write set 132. Both of these sets 126 and 132, and corresponding statement IDs 140 may be persisted to NVM 108 as part of transaction object 124. Statement rollback is an additional functionality that may not be included other embodiments in which the statement IDs 140 are not stored.

Algorithm 8B

```
1:   function RECOVERDB
2:       RecoverWorkingPointers( );             ▷ Set working pointers by converting their relative PPtrs
3:       for each pTab in m_tables do           ▷ Recover table contents
4:           pTab→Recover ( );
```

Algorithm 8B

```
5:      for each pTxInfo in m_persTxInfoArray do              ▷ Finish committed TXs
6:          if pTxInfo.IsCommitted = = TRUE then
7:              RecoverTransaction(pTxInfo, pTxInfo.commitTS);
8:      for each pTxInfo in m_persTxInfoArray do              ▷ Undo uncommitted TXs
9:          if pTxInfo.IsCommitted = = FALSE then
10:             RecoverTransaction(pTxInfo, kInfinityTS);
11:     m_txInfoArray = new TxTransientInfo[m_MaxParallelTX];  ▷ Build new txInfoArray
12:     for (txid = 0; txid < m_MaxParallelTX; ++txid) do      ▷ Initialize txid of each txInfo
13:         m_txInfoArray [i].txid = txid;
14:     m_currentTime = MaxCommitTS( );                        ▷ Set current time to max commiTS in persTxInfoArray
15:     m_curMinSTS = m_currentTime;                           ▷ Set CurMinSTS to current time
16:     thread recoverGarbage(m_curMinSTS, tableSizes);        ▷ Recover garbage in the background
17:     RecoverSecondaryDataStructures( );                     ▷ Recover transient or hybrid indexes
```

Algorithm 8B may be a general recovery function performed by TSS 102, according to an embodiment. Line 6 shows that TSS 102 may check whether the commit flag 136 value is equal to true, in which case Algorithm 8A may be executed with a timestamp value CTS 120A. In lines 9-10, if commit flag 136 is set to false, then the recover transaction (Algorithm 8A) is called with the infinity timestamp which may be used to replace the TXID 130A values. In an embodiment, if CTS 120 is set to infinity, then no transaction can ever see this row.

Depending on which timestamp (CTS 120A or infinity) is provided, Algorithm 8A will either continue the transaction or roll back, respectively. Once commit flag 136 is set to true, other transactions may query a particular transaction to see if the value is visible and make other decisions based on that, before the data was persisted or updated, even if the transaction did not finish the last part of commit which was persistently updating the timestamps. Once the state of transaction object 124 is changed to committed, TSS 102 may ensure the committed values are persisted. In an embodiment, rolling forward the commit phase may ensure that such consistency and data integrity is maintained.

TSS 102 may read the DTS 112 of the rows in the delete set and test whether the value is a timestamp (CTS 120A) or a TXID 130A. If the value is a TXID 130A, the value is updated to CTS 120A if a roll forward is being performed. If a roll backward is being performed, DTS 112 may be set to infinity. While deletion operations only update DTS 112, creation operations update both CTS 120 and DTS 112 for a particular row. If a transaction is committed, the DTS 112 may be set to infinity (for visible), otherwise if aborting and rolling back, the DTS 112 may be set to min STS 118A or below for garbage collection.

Typically when a DB crashes, any transaction that was running during that time is aborted, and any inflight transactions that were being executed are rolled back and aborted. TSS 102 enables a continuation of these inflight transactions, and enables an undo to be performed on the statement within the transaction (the transaction has multiple statements) that did not complete. In an embodiment, an administrator or other user may be provided the option of continuing the transaction that was running during the system failure or rolling back.

In an embodiment, to enable the statement roll forward operation, transaction object 124 may include a statement identifier 140. As noted above, write set 132 may include a reference to a table ID and row ID of a particular row, but this may not identify the statement being executed. As such, TSS 102 may track or maintain statement ID 140 for each row reference in write set 132.

For example, a transaction 106 may include multiple statements or actions that are executed as part of the transaction. TSS 102 may include a statement counter (which may be a private counter for each transaction 106) that assigns identifiers to each statement. For example, a first statement may be statement 1, a second statement may be statement 2, etc. Then, for example, TSS 102 may determine which rows were modified by which statements of a transaction 106. By maintaining this additional information, an administrator or user may have the option to abort transactions, or preserve completed statements and continue the transaction.

In an embodiment, transaction object 124 may be persisted to NVM 108 in full. For example, all of the information of transaction object 124 may be persisted to NVM 108, rather than only a portion of it. This full persistence may create additional persistence overhead, but may save resources in case of failure, because roll forwards may be performed. In an embodiment, transaction object 124 may be stored in NVM 108 and a portion of transaction object 124 (which may be duplicative to the NVM 108 persisted portion) may be referenced from VM 110.

Figure 2:
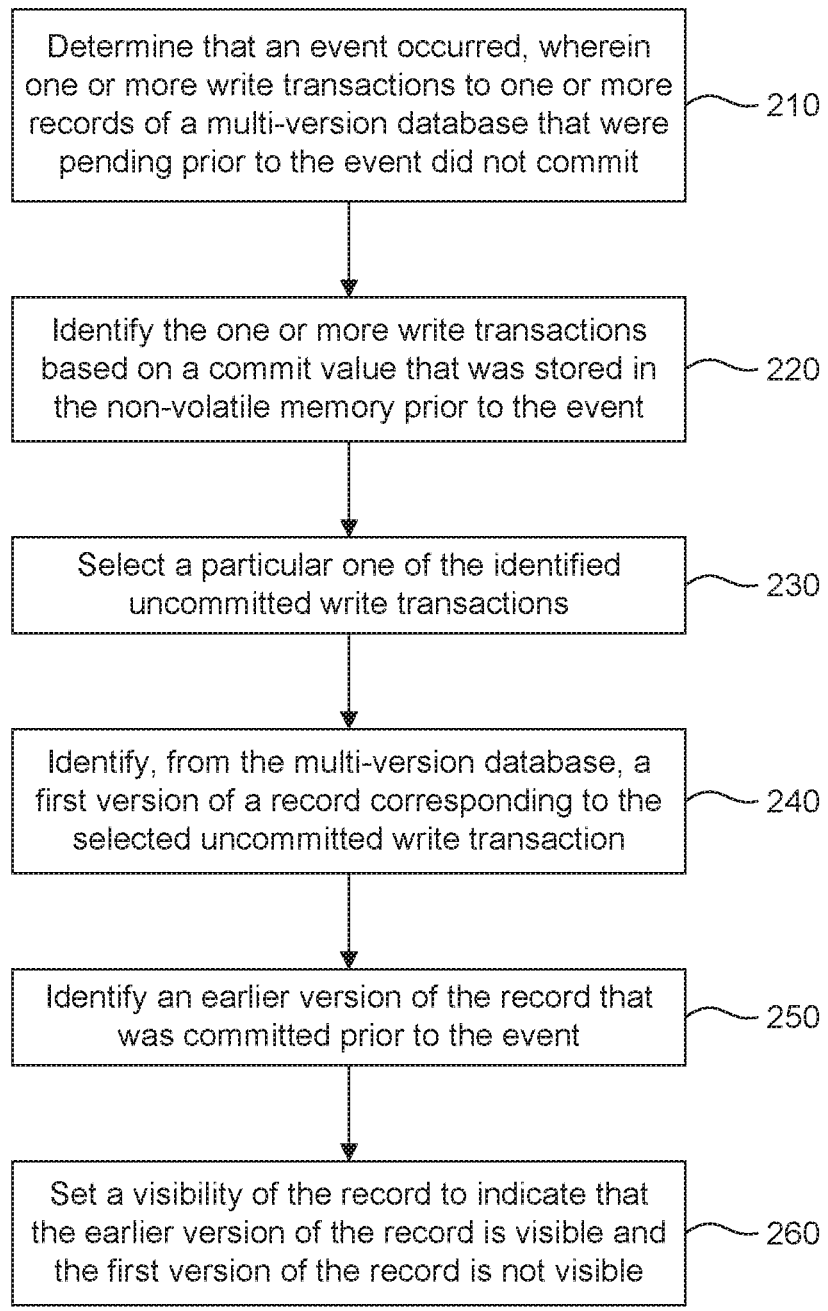
FIG. 2 is a flowchart for performing a recovery process associated with a multi-version concurrency control (MVCC) system, according to an example embodiment.

FIG. 2 is a flowchart for performing a recovery process associated with a multi-version concurrency control (MVCC) system, according to an example embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to the example embodiments.

In 210, it is determined that an event occurred, wherein one or more write transactions to one or more records of a multi-version database that were pending prior to the event did not commit. For example, there may be multiple transactions 106 being executed (in parallel) against the data of MDB 104. One or more of the transactions 106 may be in-progress, in-flight, or otherwise uncommitted when a computer system crashes, the power goes out, or some other reboot event occurs.

In 220, the one or more write transactions are identified based on a commit value that was stored in the non-volatile memory prior to the event. For example, upon a system reboot, write set 132 may be read. Each transaction 106 may have its own write set 132. Write set 132 may be stored in NVM 108, and may identify which records or tuples were being written to or modified by the transaction when the system crashed. Transaction object 124, as stored in NVM 108, may include commit flag 136 that indicates whether or not the transaction 106 committed its changes to the records. Based on the commit flag 136, which may be stored in NVM 108, the transactions 106 that were in in-progress but did not commit may be identified.

In 230, a particular one of the identified uncommitted write transactions is selected. For example, one of the identified uncommitted transactions 106 may be selected for rollback. In an embodiment, multiple uncommitted transactions may be selected and processed in parallel (e.g., by different processors or computing threads).

In 240, a first version of a record corresponding to the selected uncommitted write transaction is identified from the write set. For example, the selected transaction may correspond to updating the value of Row 1. Row 1B may correspond to a first version of data that was being updated by the transaction 106 that did not commit.

In 250, an earlier version of the record that was committed prior to the event is identified. For example, Row 1A may be an earlier version of the record that was committed prior to the crash or system reboot.

In 260, a visibility of the record is set to indicate that the earlier version of the record is visible and the first version of the record is not visible. For example, the DTS 112 of the rows 1A and 1B may be updated such that row 1A is indicated as visible, and row 1B is indicated as invisible. In an embodiment, DTS 112 may be set to less than or equal to Min STS 118A indicating that row 1B is immediately available for garbage collection if the transaction 106 is being rolled back, thus the resources previously being consumed may be made immediately available for reuse. In an embodiment, a DTS 112 value of infinity or another designed value may indicate that the row version is the latest version of the row.

Figure 3:
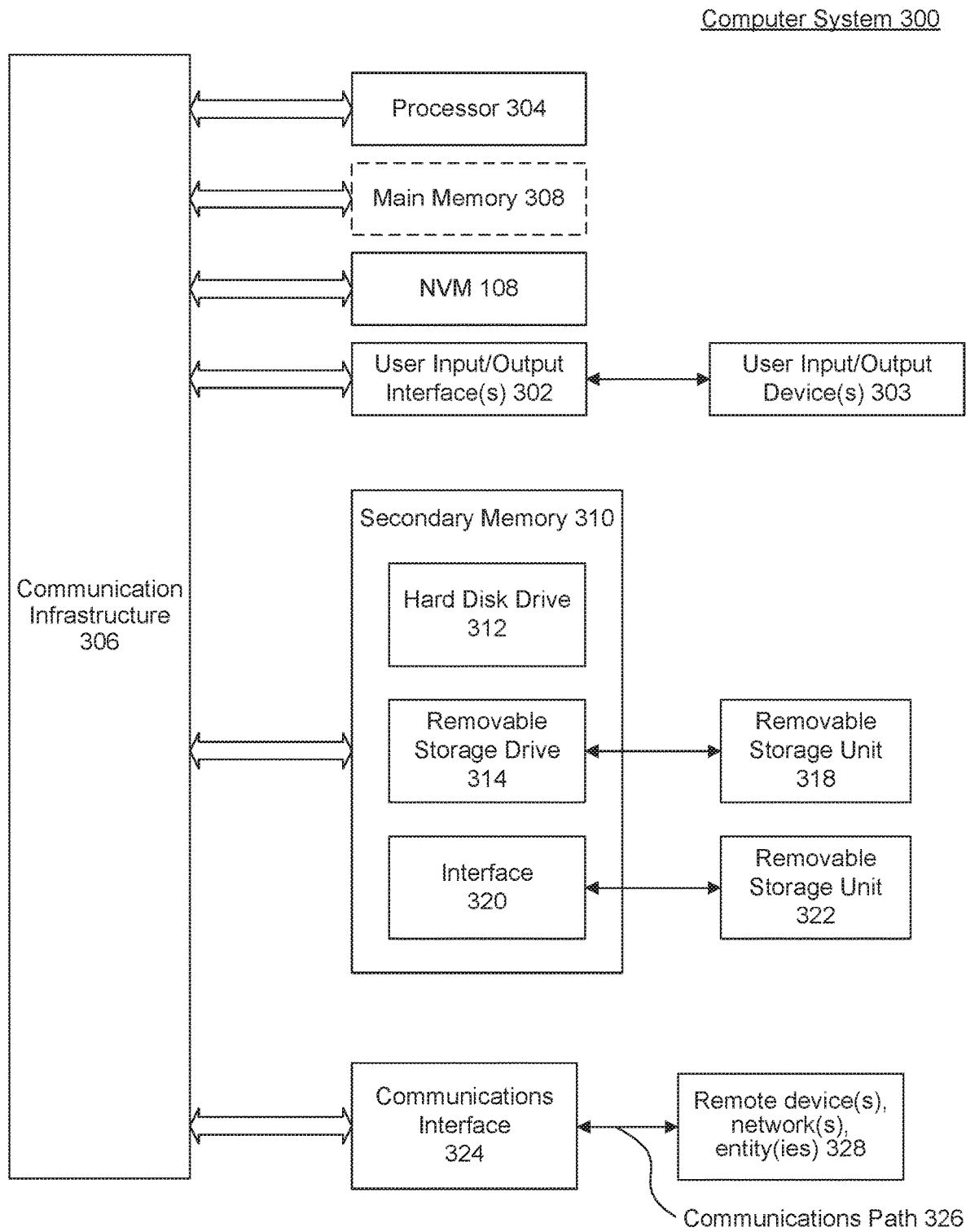
FIG. 3 is an example computer system useful for implementing various embodiments.

FIG. 3 is an example computer system 300 useful for implementing various embodiments. Various embodiments can be implemented, for example, using one or more well-known computer systems, such as computer system 300 shown in FIG. 3. Computer system 300 can be any well-known computer capable of performing the functions described herein.

Computer system 300 includes one or more processors (also called central processing units, or CPUs), such as a processor 304. Processor 304 is connected to a communication infrastructure or bus 306.

One or more processors 304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. Or for example, one or more processors may be a field-programmable gate array (FPGA) which may be configured by a user or designer after manufacturing.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 may include one or more levels of cache. Main memory 308 has stored therein control logic (i.e., computer software) and/or data. In an embodiment, main memory 308 may include both volatile memory 307 and non-volatile memory 309. Non-volatile memory 309 may correspond to persistent memory 110 described herein. Volatile memory 307 may include any memory or storage that resets or does not persist on a power cycle of computer system 300.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In an embodiment, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

Figure 4:
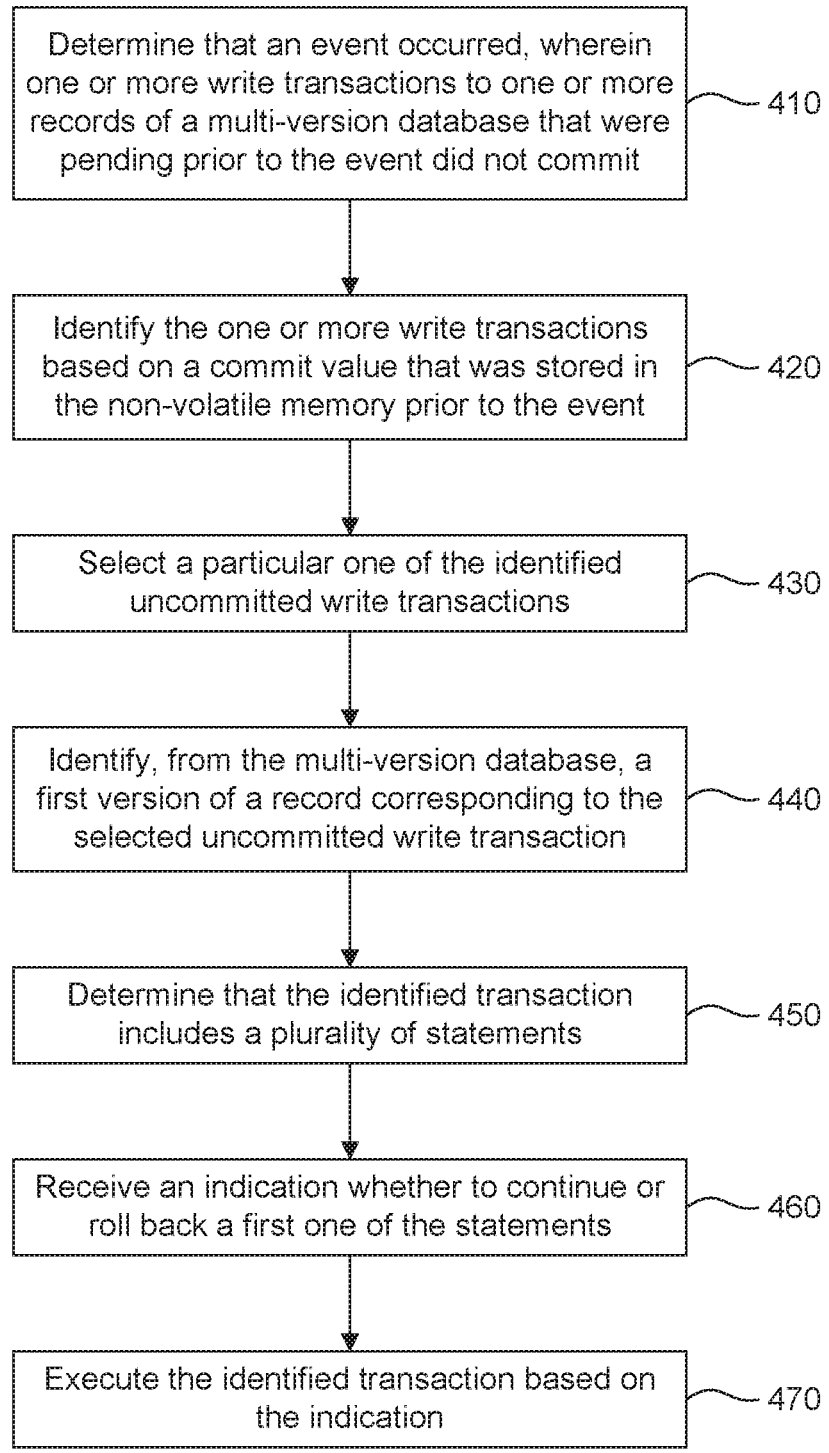
FIG. 4 is a flowchart for performing a recovery process associated with a multi-version concurrency control (MVCC) system, according to another example embodiment.

FIG. 4 is a flowchart 400 for performing a recovery process associated with a multi-version concurrency control (MVCC) system, according to another example embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 1. However, method 400 is not limited to the example embodiments.

Elements 410-440 are substantially similar to elements 210-240 described above with respect to FIG. 2.

In 450, it is determined that the identified transaction includes a plurality of statements. For example, a transaction 106 may include multiple different statements that are executed as part of the transaction. In an embodiment, each statement may have its own statement ID 140.

In 460, an indication is received as to whether to roll back or roll forward a first one of the statements. For example, TSS 102 may provide an administrator the option of whether to continue processing (roll forward) or to abort (and roll back) each statement of a particular transaction 106. This may save processing resources by preventing the unnecessary duplicative execution of statements that have already been executed.

In 470, the identified transaction is executed based on the indication. For example, if a roll back indication is received, then a previous state of the data is set to be visible (as described above with respect to FIG. 2). Or, for example, if a roll forward indication is received, then execution may continue where the most recent statement of the transaction completed execution.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   determining that an event occurred, wherein one or more write transactions to one or more records of a multi-version database that were pending prior to the event did not commit, and wherein the multi-version database is stored in a non-volatile memory;
   identifying the one or more write transactions based on a commit value that was stored in the non-volatile memory prior to the event, wherein each of the one or more write transactions includes a commit value;
   selecting a particular one of the identified uncommitted write transactions;
   identifying, from the multi-version database, a first version of a record corresponding to the selected uncommitted write transaction, wherein the first version was not committed;
   identifying an earlier version of the record that was committed prior to the event;
   setting a visibility of the record to indicate that the earlier version of the record is visible and the first version of the record is not visible;
   setting a delete timestamp corresponding to the first version of the record below a garbage collection threshold;
   determining that the delete timestamp is part of an update operation;
   adding a new version of the record corresponding to the first version of the record to the database; and
   setting a commit timestamp for the new version of the record greater than the garbage collection threshold.

2. The method of claim 1, wherein the setting the visibility comprises:
   setting a delete timestamp corresponding to the earlier version of the record to indicate that the earlier version of the record is visible, wherein the visibility of a record to a transaction is based on the delete timestamp.

3. The method of claim 1, wherein the garbage collection threshold is based on a minimum starting timestamp corresponding to a time when an oldest running transaction began.

4. The method of claim 1, wherein the event corresponds to a computer system crash or reboot.

5. The method of claim 1, wherein the selecting comprises:

determining that the identified transaction comprises a plurality of statements, wherein the multi-version database includes a statement identifier for each of the plurality of statements; and identifying a first statement of the plurality of statements.

6. The method of claim 5, wherein the statement identifier is based on a statement counter, and wherein a transaction identifier corresponding to the selected uncommitted write transaction corresponds to a transaction counter different from the statement counter.

7. A system, comprising:
a memory; and
at least one processor coupled to the memory and configured to:
  determine that an event occurred, wherein one or more write transactions to one or more records of a multi-version database that were pending prior to the event did not commit, and wherein the multi-version database is stored in a non-volatile memory;
  identify the one or more write transactions based on a commit value that was stored in the non-volatile memory prior to the event, wherein each of the one or more write transactions includes a commit value;
  select a particular one of the identified uncommitted write transactions;
  identify, from the multi-version database, a first version of a record corresponding to the selected uncommitted write transaction, wherein the first version was not committed;
  identify an earlier version of the record that was committed prior to the event;
  set a visibility of the record to indicate that the earlier version of the record is visible and the first version of the record is not visible;
  set a delete timestamp corresponding to the first version of the record below a garbage collection threshold;
  determine that the delete timestamp is part of an update operation;
  add a new version of the record corresponding to the first version of the record to the database; and
  set a commit timestamp for the new version of the record greater than the garbage collection threshold.

8. The system of claim 7, wherein the processor that sets the visibility is configured to:
  set a delete timestamp corresponding to the earlier version of the record to indicate that the earlier version of the record is visible, wherein the visibility of a record to a transaction is based on the delete timestamp.

9. The system of claim 7, wherein the garbage collection threshold is based on a minimum starting timestamp corresponding to a time when an oldest running transaction began.

10. The system of claim 7, wherein the event corresponds to a computer system crash or reboot.

11. The system of claim 7, wherein the processor that selects is configured to:
  determine that the identified transaction comprises a plurality of statements, wherein the multi-version database includes a statement identifier for each of the plurality of statements; and
  identify a first statement of the plurality of statements.

12. The system of claim 11, wherein the statement identifier is based on a statement counter, and wherein a transaction identifier corresponding to the selected uncommitted write transaction corresponds to a transaction counter different from the statement counter.

13. A non-transitory computer-readable device having instructions stored thereon that, when executed by at least one computing device, causes the at least one computing device to perform operations comprising:
  determining that an event occurred, wherein one or more write transactions to one or more records of a multi-version database that were pending prior to the event did not commit, and wherein the multi-version database is stored in a non-volatile memory;
  identifying the one or more write transactions based on a commit value that was stored in the non-volatile memory prior to the event, wherein each of the one or more write transactions includes a commit value;
  selecting a particular one of the identified uncommitted write transactions;
  identifying, from the multi-version database, a first version of a record corresponding to the selected uncommitted write transaction, wherein the first version was not committed;
  identifying an earlier version of the record that was committed prior to the event;
  setting a visibility of the record to indicate that the earlier version of the record is visible and the first version of the record is not visible;
  setting a delete timestamp corresponding to the first version of the record below a garbage collection threshold;
  determining that the delete timestamp is part of an update operation;
  adding a new version of the record corresponding to the first version of the record to the database; and
  setting a commit timestamp for the new version of the record greater than the garbage collection threshold.

14. The device of claim 13, wherein the setting the visibility comprises:
  setting a delete timestamp corresponding to the earlier version of the record to indicate that the earlier version of the record is visible, wherein the visibility of a record to a transaction is based on the delete timestamp.

15. The device of claim 13, wherein the garbage collection threshold is based on a minimum starting timestamp corresponding to a time when an oldest running transaction began.

16. The device of claim 13, wherein the event corresponds to a computer system crash or reboot.

17. The device of claim 13, wherein the one computing device configured to select is configured to perform operations comprising:
  determining that the identified transaction comprises a plurality of statements, wherein the multi-version database includes a statement identifier for each of the plurality of statements; and
  identifying a first statement of the plurality of statements, wherein the statement identifier is based on a statement counter, and wherein a transaction identifier corresponding to the selected uncommitted write transaction corresponds to a transaction counter different from the statement counter.

* * * * *